W. DIETER.
PRESSURE REDUCING VALVE.
APPLICATION FILED FEB. 20, 1919.
1,386,051.
Patented Aug. 2, 1921.
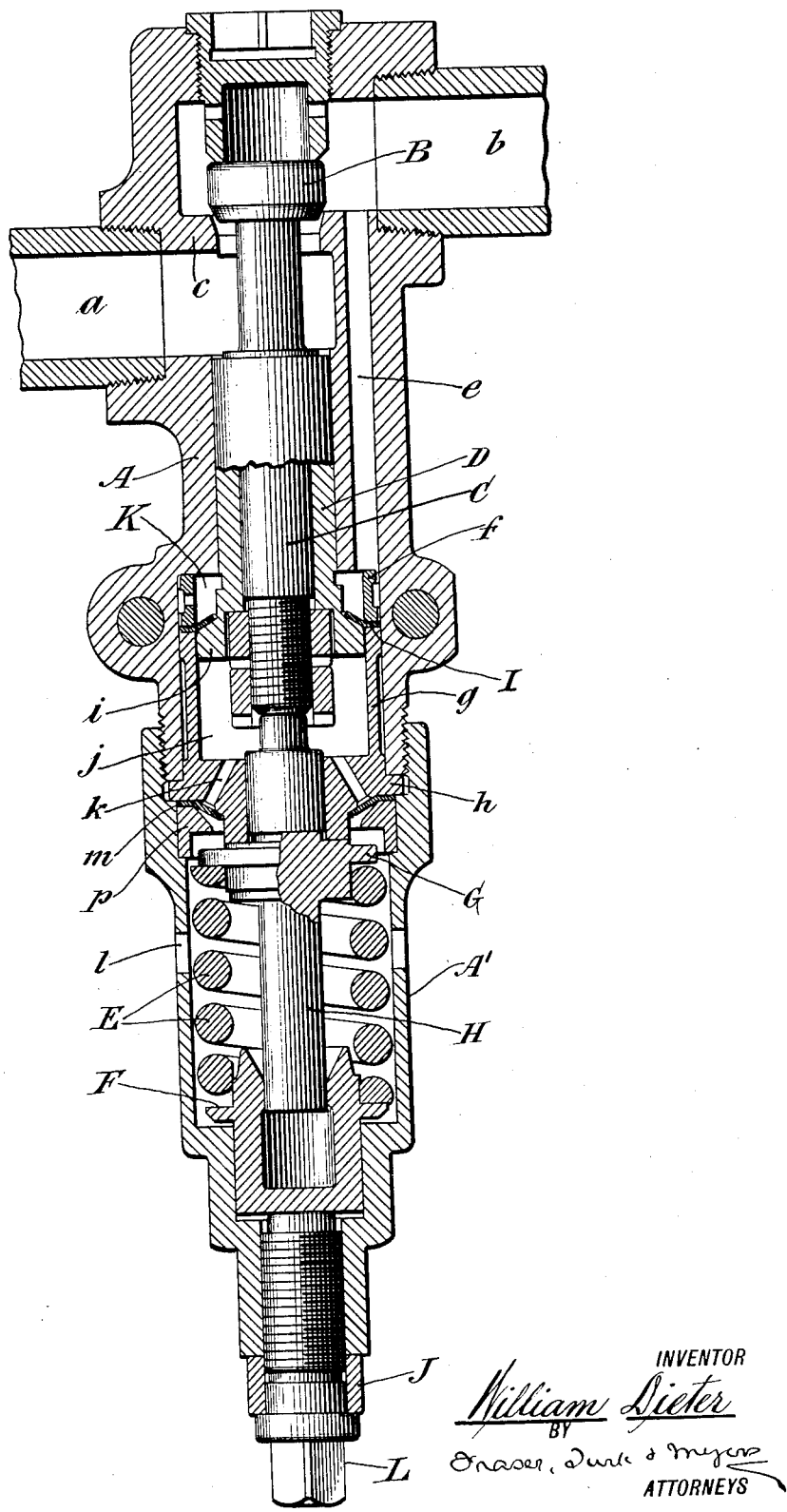
INVENTOR
William Dieter
BY
Fraser, Usrk & Myers
ATTORNEYS

UNITED STATES PATENT OFFICE.

WILLIAM DIETER, OF BROOKLYN, NEW YORK.

PRESSURE-REDUCING VALVE.

1,386,051.  Specification of Letters Patent.  Patented Aug. 2, 1921.

Application filed February 20, 1919. Serial No. 278,204.

*To all whom it may concern:*

Be it known that I, WILLIAM DIETER, a citizen of the United States of America, residing in borough of Brooklyn, county of Kings, city and State of New York, have invented certain new and useful Improvements in Pressure-Reducing Valves, of which the following is a specification.

This invention provides a pressure reducer applicable for reducing a fluid from a very high to a much lower pressure. It is especially designed and adapted for use with automobile torpedoes for dropping from the flask pressure, which initially is about 2800 pounds per square inch and gradually falls during the run to perhaps 600 pounds per square inch, to a constant working pressure at which the compressed air is fed to the engine or turbine, which ordinarily may approximate 400 pounds per square inch.

Such pressure reducing valves are necessarily of the balanced valve type, and as the balancing plunger must work freely, it is inevitable that there shall be some leakage of the high pressure air past such plunger. Such leakage involves a waste of compressed air, and also has the disadvantage that the fall in pressure of the air thus leaking effects refrigeration which interferes with the proper lubrication of the working parts of the valve. Efforts have been made to avoid such leakage by resort to packing means of the flexible diaphragm type, which should yield to the limited movement of the valve, but while such means are applicable at low pressures, they are unsatisfactory at the extremely high pressures used in torpedo practice.

The present invention is designed to provide an improved construction of reducing valve whereby not only to provide more effective packing means, but also to render the valve more effective in operation, so that notwithstanding wide variations of initial pressure, it shall attain an ideal stability in pressure on the outlet side. The construction and advantages will be made apparent as the description proceeds.

A suitable embodiment of the invention is shown in the accompanying drawing, which is a longitudinal mid-section of the valve.

Referring to the drawing,—A is the valve shell as a whole having an inlet $a$ and an outlet $b$; B is the valve or tappet which may close against a seat $c$; C is the valve spindle, and D is the balancing plunger fixed thereon, and having a diameter slightly exceeding the essential diameter of the tappet, so as to slightly overbalance the latter; and E is the usual spring reacting against a flanged follower F and pressing against a flanged collar G, which may be formed integrally on a stem H, which stem communicates its stress to the valve stem C in direction tending to open the valve. The parts described are of the usual and well-known construction, and the operation does not differ from that of similar pressure reducing valves as heretofore made. Examples of such valves are found in my Patents, Nos. 1,131,341, dated March 9, 1915, and 1,136,660, dated April 20, 1915.

In the particular construction shown the shell A is made in two parts, of which the lower section A' affords the housing for the spring as heretofore. Its lower end is threaded to engage the usual adjusting screw I for varying the stress of the spring by adjusting the flanged follower F to more or less compress the spring. As this adjustment determines the outlet pressure, and in a torpedo determines the speed, it is advantageously limited for any required condition by the selection and introduction of a suitable spacing piece or "speed ring" J, as heretofore.

According to the present invention an annular chamber K is provided in communication with the lower portion of the plunger D, so that any leakage around this plunger flows into this annular chamber, and escapes therefrom by a duct or bore $e$ conveniently formed through the shell A, and discharging the leakage to the outlet side of the valve, so that the pressure in chamber K remains constant, being the same as that in the outlet $b$. A flexible gasket or packing ring L, preferably of rubber or leather, is provided for sealing the annular chamber K and bridging the space between the plunger and the wall of the shell in such manner, as to yield to the limited movement of the valve, while preventing leakage. In the preferred construction shown, this packing washer or gasket L is confined tightly at its outer margin between two tubular lining sections $f\ g$, the latter being formed with a flanged portion $h$, which is confined between the valve shell sections A and A'. When these sections are screwed tightly together the lining $g$ is forced so tightly against the lining $f$ as to pinch the margin of the packing L with the requisite firmness to avoid leakage. The inner portion of the packing L rests upon a flange or piston $i$ formed on or connected with the plunger D (or equivalently with the valve stem C), and forming a loose fit with the interior of the lining $g$ and having preferably a rounded upper face against which the free inner portion of the packing rests. The pressure within the chamber K, being approximately 400 pounds per square inch, presses downwardly upon the free portion of the packing, and holds it tightly pressed against the flange $i$, so as to make a tight joint between the lining and this flange. This joint is practically leak-tight, but any minute leakage into the chamber $j$ beneath it may escape through holes $k$ bored through the inner or lining shell into the interior of the shell A' and thence outwardly through a vent $l$. To prevent any contrary flow, a check valve $m$ is provided which yields to a downward flow, but seals the holes $k$ against an upward flow. In the construction shown this check valve consists of a gasket or packing ring which is pinched at its outer margin between the flanged portion $h$ of the lining shell and an inserted follower $p$, sufficient clearance being left between these parts $h$ and $p$ inside of the outer margin of the packing ring to leave its inner portion free, so that it may yield downwardly to permit an outflow from the holes $k$.

The advantages of the new construction of reducing valve may now be made clear. Inasmuch as the pressure in the annular chamber K is a reduced and normally constant pressure which acts downwardly against the unbalanced area of the piston flange $i$ and is resisted by the stress of the spring, its effect is to steady the action of the valve and prevent fluctuation or chattering. It also renders the valve more sensitive than such valves as heretofore constructed, because any fluctuation in pressure on the outlet side of the valve, taken close to the tappet, where such fluctuation would be most apparent, is transmitted through the duct $e$ to the chamber K, where it acts at once upon the area of the piston flange $i$ in such direction as to tend to stabilize the pressure; that is, if the tappet should be open beyond its ideal position, so that momentarily an excessive pressure is liberated to the outlet side, such higher pressure transmitted to the annular chamber, acts downwardly on the piston $i$, and tends to force the tappet down to a proper position; and vice versa, if the pressure beyond the tappet falls below the normal. The stabilizing effect due to the action just described could be relatively increased by increasing the diameter of the annular chamber, and consequently the area of the piston-like element $i$.

The leakage which necessarily occurs around the plunger D, instead of escaping to the exterior and being a waste of valuable compressed air, is vented through the bore $e$ to the eduction side of the valve, thus effecting a desirable economy; but as the proportion of air thus escaping is small in comparison with that passing through the valve, it does not affect the control of the pressure by the valve. There being no leakage of high pressure air to the exterior, the refrigeration incident to such leakage is avoided; consequently, the valve works with the utmost attainable freedom and sensitiveness. The improved construction of valve is found in practice to give an ideally uniform outlet pressure during the entire range of inlet pressures from the initial 2800 pounds to the final pressure approaching 600 pounds per square inch; a result heretofore attainable only by means of duplex valves giving a two-stage reduction.

The improved construction of valve also provides against the possibility of forcing liquid into the valve and into the outlet passage therefrom when the inflow to the reducing valve is shut off. In a torpedo this condition occurs during preliminary testing when the torpedo is subjected to an external testing pressure of approximately 75 pounds per square inch; it also occurs when the torpedo is placed in a submerged launching tube which receives a varying hydrostatic pressure according to the depth of submersion, such condition continuing until the launching of the torpedo. Under such conditions water enters the torpedo, and would pass into the reducing valve through the vents $l\ k$, and by lifting the gasket L would flow up around the balancing plunger and through the vent port $e$, thus entering the outlet from the valve, were it not for the provision of the check valve $m$.

The present invention is not limited to the specific construction shown and described as this is susceptible of variations in detail without departing from the essential features of the invention set forth in the claims. For example, it is not requisite that the flexible gasket or packing ring be annularly gripped at its outer margin and supported at its inner margin on a flange formed upon the plunger, as these respective means might be reversed or transposed. So far as the effective packing of the chamber K is concerned, any means whereby the flexible gasket may be supported against the internal pressure within the annular chamber, and may effect at its outer margin a tight packing engagement with the outer wall of the chamber and at its inner margin a tight packing engagement with the plunger, is within the invention.

What I claim is:—

1. A pressure-reducing valve comprising a casing, and a spring-pressed valve or tappet having a balancing plunger, the casing having an annular chamber receiving leakage past said plunger, with a vent therefrom to the outlet, a flexible annular gasket closing said chamber, and means in the casing and on the plunger respectively for engaging said gasket, said means having substantially continuous surfaces affording a support for the entire area of the gasket against the pressure in said chamber, while permitting it to yield to the movement of the valve.

2. A pressure-reducing valve comprising a casing, and a spring-pressed valve or tappet having a balancing plunger, the casing having an annular chamber receiving leakage past said plunger, with a vent therefrom to the outlet, a flexible annular gasket forming a tight closure for said chamber, and means for supporting the gasket, comprising an annular flange on the plunger and an annular ledge within the casing, their surfaces against the gasket closely approaching each other and closely adjacent and substantially continuous so as to support the entire area of the gasket against the pressure in said chamber, while permitting it to yield to the movement of the valve, said gasket annularly confined at one edge and free at the other.

3. A pressure-reducing valve comprising a casing, and a spring-pressed valve or tappet having a balancing plunger, the casing having an annular chamber receiving leakage past said plunger, with a vent therefrom to the outlet, a flexible annular gasket closing said chamber, means in the casing for gripping the outer margin of said gasket, and the plunger having a flange wholly supporting the free inner portion of the gasket but unattached thereto.

4. A pressure-reducing valve comprising a casing, and a spring-pressed valve or tappet having a balancing plunger, the casing having an annular chamber receiving leakage past said plunger, with a vent therefrom to the outlet, a flexible annular gasket closing said chamber, the casing having two annular lining sections for gripping the outer margin of said gasket between them, and means for forcing said sections tightly together, and the plunger having a flange supporting the entire free inner portion of the gasket against the pressure in said chamber.

5. A pressure-reducing valve comprising a casing, and a spring-pressed valve or tappet having a balancing plunger, the casing having an annular chamber receiving leakage past said plunger, with a vent therefrom to the outlet, a flexible annular gasket closing said chamber, and means in the casing and on the plunger respectively for engaging said gasket and supporting it against the pressure in said chamber, said engaging means comprising gripping means applied to one part for gripping one annular margin of the gasket, and a flange on the other part for supporting the entire remaining annular portion of the gasket against the pressure in said chamber.

6. A pressure-reducing valve according to claim 1, having beyond said chamber a vent for the escape to the exterior of leakage past said gasket, and a check valve for closing said vent against a counterflow of fluid.

7. A pressure-reducing valve according to claim 1, having beyond said chamber ducts for the escape to the exterior of leakage past said gasket, and a check valve adapted to yield to such flow and close against an opposing flow, comprising a packing ring with means for clamping it marginally while leaving free its portion engaging such vent ducts.

8. A pressure-reducing valve according to claim 1, having a chamber receiving leakage past such gasket, and a spring chamber, with vents in the casing between said chambers, a check valve comprising a packing ring confined at its outer margin and its free inner portion normally closing said vents, the respective chambers united by a screw engagement and clamping such ring between them.

In witness whereof I have hereunto signed my name.

WILLIAM DIETER.